United States Patent [19]

Pappalardo et al.

[11] 4,446,049
[45] May 1, 1984

[54] YELLOW-EMITTING HALOPHOSPHATE PHOSPHOR OF IMPROVED BRIGHTNESS AND METHOD

[75] Inventors: Romano G. Pappalardo, Sudbury; Thomas E. Peters, Chelmsford, both of Mass.

[73] Assignee: GTE Laboratories Incorporated, Waltham, Mass.

[21] Appl. No.: 435,846

[22] Filed: Oct. 21, 1982

[51] Int. Cl.$^3$ ............................................. C09K 11/435
[52] U.S. Cl. ......................... 252/301.6 P; 252/301.4 H; 252/301.4 P
[58] Field of Search .................... 252/301.4 P, 301.6 P, 252/301.4 H

[56] References Cited

U.S. PATENT DOCUMENTS

| | | | |
|---|---|---|---|
| 2,476,654 | 7/1949 | Froelich | 252/301.4 P |
| 2,579,900 | 12/1951 | Butler | 252/301.4 P |
| 2,619,471 | 11/1952 | Butler | 252/301.4 P |
| 2,664,401 | 12/1953 | McKeag et al. | 252/301.4 P |
| 2,965,786 | 12/1960 | Aia et al. | 252/301.6 P X |
| 3,198,742 | 8/1965 | Ropp | 252/301.4 P |

FOREIGN PATENT DOCUMENTS

| | | | |
|---|---|---|---|
| 580363 | 9/1946 | United Kingdom . | |
| 877536 | 9/1961 | United Kingdom | 252/301.4 P |

*Primary Examiner*—Jack Cooper
*Attorney, Agent, or Firm*—Jerry F. Janssen; Ivan L. Ericson

[57] ABSTRACT

Phosphors and a method for producing yellow-emitting tin-manganese coactivated calcium fluorophosphate phosphors having improved brightness comprises the steps of blending a powder mixture including the phosphates, carbonates, fluorides and oxides of calcium, tin, and manganese together with an ammonium salt, and firing the mixture at a temperature of between about 1100° C. and about 1300° C. for a period sufficient to produce a luminescent composition. The presence of an ammonium compound in the initial powder blend promotes the proper atmosphere during the firing step to insure the incorporation of proper levels of tin and manganese ions in the final phosphor.

11 Claims, 2 Drawing Figures

YELLOW-EMITTING HALOPHOSPHATE PHOSPHOR OF IMPROVED BRIGHTNESS AND METHOD

BACKGROUND OF THE INVENTION

This invention relates to luminescent materials and methods of making luminescent materials. More particularly, it is concerned with yellow-emitting tin and manganese coactivated calcium fluorophosphate phosphors and with methods of making such phosphors having improved brightness.

It is known to utilize halophosphate phosphors in fluorescent lamps generating one of a number of standard white spectral distributions. Manganese activated halophosphate phosphors are well known in the art for this purpose. Normally, however, these phosphors are not ideally suited for low-pressure mercury-vapor fluorescent lamp applications when activated with manganese alone. Manganese does not appreciably absorb short-wavelength ultraviolet light in the 254 nanometer region. Hence a sensitizer ion, capable of absorbing short-wavelength ultraviolet and of subsequently transferring the absorbed energy to manganese, is required to make such phosphors efficient for this application. In the family of commercially available calcium halophosphate phosphors activated with manganese, antimony is typically employed as the sensitizer ion.

It has been shown, however, that other ions can be used to sensitize manganese in halophosphate phosphors. British patent specification No. 877,536, for example, discloses calcium halophosphate phosphors coactivated with copper and manganese or with tin and manganese. The method for the production of the phosphors disclosed there involves repeated firing of the phosphor precursor blend in an applied weakly reducing atmosphere of hydrogen and nitrogen to optimize brightness output of the phosphor.

BRIEF SUMMARY OF THE INVENTION

There are provided, in accordance with the present invention, tin-manganese coactivated calcium fluorophosphate phosphors of enhanced brightness and a method for producing such phosphors. Incorporation of both tin and manganese ions at appropriate levels into calcium fluorophosphate phosphors of this invention is accomplished by a single firing, in a neutral atmosphere or in a wet mildly reducing atmosphere, of an initial powder blend which contains at least one ammonium compound. The resulting phosphors are characterized by peak emission at about 575 nanometers wavelength and enhanced brightness.

In particular, luminescent materials exhibiting characteristic peak emission at about 575 nanometers when excited by ultraviolet light have compositions given by the general formula:

where Me is a divalent metal partially substituting for calcium, selected from zinc, cadmium, and the alkaline earth metals, [] is the non-stoichiometric factor, and $0.001 \leq v \leq 0.10$
$0.01 \leq w \leq 0.06$
$0.15 \leq x \leq 0.35$
$0.08 \leq y \leq 0.16$ and
$0.90 \leq z \leq 1.10$.

In accordance with this invention, the method of forming luminescent materials of enhanced brightness having the compositions defined above comprises first forming a mixture of powders including the carbonates, fluorides, oxides, and phosphates of the metals, together with an ammonium compound, and then firing the resulting mixture in a neutral or wet mildly reducing atmosphere at a temperature within the range of about 1100° C. to about 1300° C. for a period sufficient to produce a phosphor having a characteristic emission peak at about 575 nanometers.

For a better understanding of the present invention, together with other and further objects, advantages and capabilities thereof, reference is made to the following disclosure in connection with the above-described drawing figures.

DETAILED DESCRIPTION

High brightness yellow-emitting tin-manganese coactivated calcium fluorophosphate phosphors of this invention possess compositions lying within the ranges specified by the general formula:

Me is a divalent metal, partially substituting for calcium, selected from among the Group IIA and IIB elements of the Periodic Table, particularly from among zinc, cadmium, magnesium, barium, strontium and mixtures of these elements. In the above formulation, cadmium is preferred and the value of v preferably ranges between about 0.001 to about 0.10.

The levels of the tin and manganese coactivating ions range, in the above formulation, respectively between $0.01 \leq w \leq 0.06$ for tin and $0.15 \leq x \leq 0.35$ for manganese. Preferred levels of incorporation of tin and manganese correspond in the above formulation to $0.02 \leq w \leq 0.04$ and $0.20 \leq x \leq 0.30$.

Figure 1:
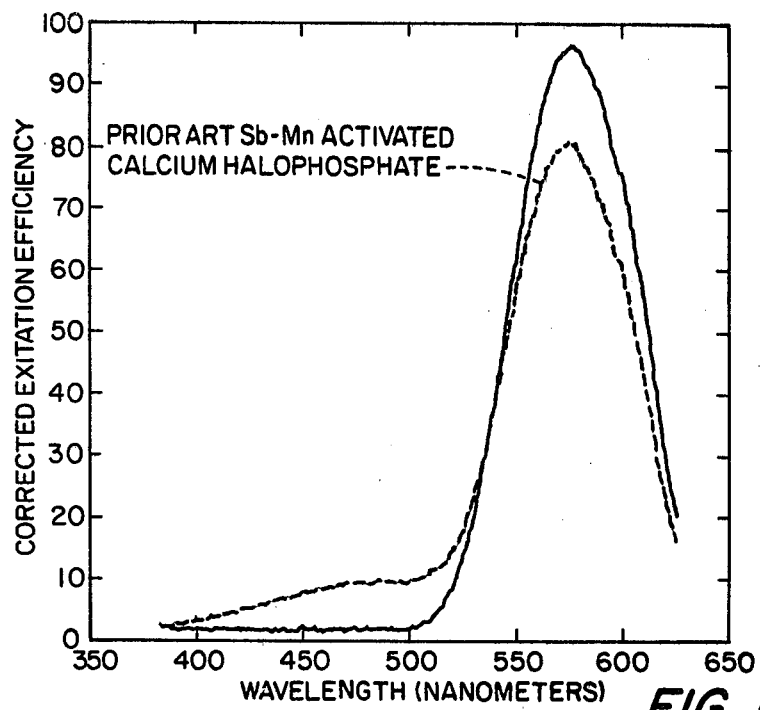
FIG. 1 is a corrected emission spectrum of a typical tin-manganese coactivated calcium fluorophosphate phosphor prepared in accordance with the method of the present invention compared with the corresponding emission spectrum of a typical prior art antimony-manganese coactivated calcium halophosphate phosphor.
Figure 2:
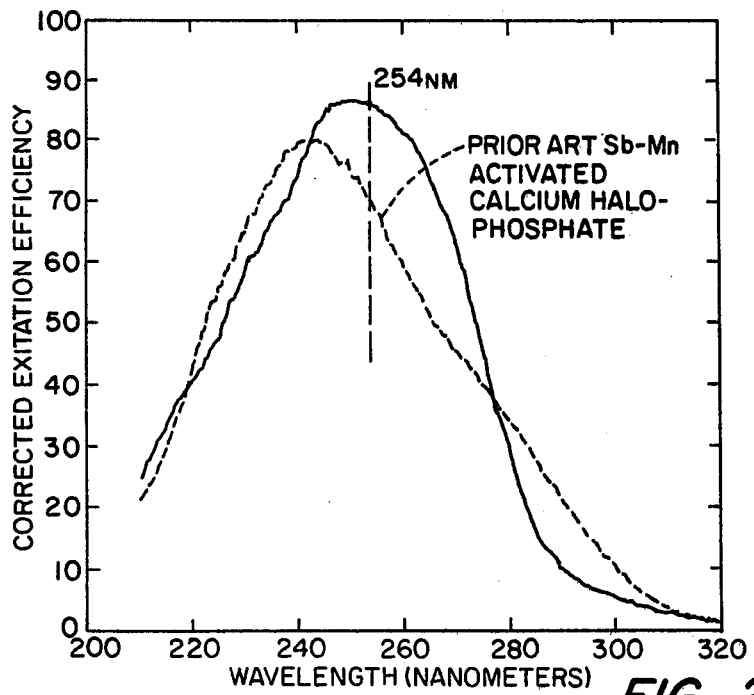
FIG. 2 is a corrected excitation spectrum for emission at 575 nm of a typical tin-manganese coactivated calcium fluorophosphate phosphor prepared in accordance with the method of the present invention compared with the corresponding excitation spectrum of the typical prior art antimony-manganese coactivated calcium halophosphate phosphor of FIG. 1.

FIGS. 1 and 2 show, respectively, the corrected emission and excitation spectra of tin-manganese coactivated calcium fluorophosphate phosphors in accordance with this invention, compared with the corresponding spectra of the prior art standard, an antimony-manganese coactivated calcium halophosphate phosphor.

These high brightness yellow-emitting tin-manganese coactivated calcium fluorophosphate phosphors can be obtained after a single firing, at temperatures ranging between about 1100° C. and about 1300° C., preferably in a neutral atmosphere such as nitrogen, or in a mildly reducing wet atmosphere of hydrogen and nitrogen, provided that suitable reagents are employed in the initial phosphor blend. By the term "neutral atmosphere" as used throughout this specification and the appended claims, is meant a gaseous atmosphere which is neither reducing nor oxidizing in character, particularly as regards the reduction or oxidation of stannous or manganous ions. The degree of reducing character of the atmosphere in which tin-manganese coactivated calcium fluorophosphate blends are fired strongly affects the ratio of incorporation of the two activating ions. Correspondingly, the proper level and ratio of tin and manganese activating ions incorporated into the final phosphor markedly affects the phosphor brightness.

By adding to the initial powder blend, prior to firing, an amount of an ammonium salt which represents between about 0.05 to about 0.15 mole fraction of the total molar amount of all compounds present in the initial powder blend, preferably about 0.10 mole fraction, the proper reducing character of the atmosphere surrounding the phosphor blend during the firing step can be maintained to optimize the final phosphor composition and brightness. In a preferred embodiment of the method, the amount of ammonium compound present in the initial powder mixture prior to firing is about 0.1 mole fraction. Preferred ammonium salts are selected from the group consisting of triammonium phosphate, diammonium hydrogen phosphate, ammonium dihydrogen phosphate, and ammonium fluoride. Among these preferred ammonium salts, diammonium hydrogen phosphate is most preferred.

The character of the firing atmosphere critically affects the composition and brightness of tin-manganese coactivated fluorophosphate phosphors. Firing atmospheres which are mildly reducing tend to favor the incorporation of stannous ions into the phosphor, but lead to insufficient incorporation of manganese. On the other hand, atmospheres which are too strongly reducing result in the reduction of stannous ion to elemental tin, resulting in loss of final phosphor brightness. Neutral firing atmospheres favor the incorporation of manganous ion at the expense of stannous ion.

It is believed that the addition of an ammonium salt to the initial phosphor blend, in accordance with the method of the present invention, results in the production of the appropriate atmosphere during the firing step to favor the correct incorporation of both stannous and manganous ion into the final phosphor. While not espousing one theory to the exclusion of others, it is believed that thermal decomposition of the ammonium salt during the early stages of firing produces the appropriate mixture of nitrogen and hydrogen gases.

Thus, the method taught in the prior art of firing the initial powder blend in a mildly reducing atmosphere without the addition of an ammonium compound generally results in the production of phosphor lots of widely varying brightness. Incorporation of an ammonium compound in the initial powder blend, as taught by the present invention, apparently lessens the criticality of the applied atmosphere during firing, and either a wet, mildly reducing atmosphere or a dry neutral atmosphere may be used during firing. A wet mildly reducing atmosphere is provided, for example, by bubbling a mixture of about 99.5 volume percent nitrogen, 0.5 volume percent hydrogen through water at room temperature. The more preferred atmosphere for firing phosphors in accordance with the method of this invention is dry, essentially pure nitrogen.

The preferred firing temperatures of the method of this invention lie between about 1100° C. and about 1300° C. In this temperature range a single firing suffices to produce bright, yellow-emitting phosphors from starting powder mixtures which contain an ammonium salt. Optionally, the starting powder blends may be pre-fired at temperatures up to about 625° C. in a dry 0.5% hydrogen, 99.5% nitrogen atmosphere prior to final firing. Although this pre-firing appears to contribute to reproducible phosphor brightness levels, it is not viewed as mandatory.

The following examples are provided to enable one skilled in the art to practice the method of the present invention. The examples are merely illustrative and should not be viewed as limiting the scope of the invention as defined by the appended claims. The brightness of phosphors prepared in accordance with the method of this invention was compared with that of a typical prior art antimony-manganese coactivated calcium halophosphate phosphor (Type 4381, Chemical and Metallurgical Division, GTE Precision Materials Group, Towanda, PA 18848), referred to throughout this specification as the prior art standard.

In Example I below, a tin-manganese coactivated calcium halophosphate phosphor was prepared in accordance with the prior art teachings of British Patent Specification 877,536. The phosphor was repeatedly fired in a mildly reducing atmosphere to optimize brightness as taught by the patentee, but the maximum brightness which was obtained was only 66% of that of the prior art standard.

On the other hand in Example II, a phosphor of essentially the same composition fired in the same mildly reducing atmosphere but from an initial blend which included diammonium hydrogen phosphate had a brightness approximately 16% greater than the prior art halophosphate phosphor.

The phosphor of Example II was heated in a dry mildly reducing atmosphere of 99.5 volume percent nitrogen and 0.5 volume percent hydrogen at temperatures up to about 625° C. Continued firing of the phosphor at temperatures above 625° C. was carried out in dry pure nitrogen. While the role of pre-firing the initial phosphor blend in a dry mildly reducing atmosphere at temperatures below about 625° C. is presently not well understood, it is believed that the step may contribute to reproducibility in brightness levels of the resulting phosphors. However, it is felt that the pre-firing step in a mildly reducing atmosphere may be omitted without prejudice to phosphor brightness.

In Example III, the phosphor was fired under an atmosphere of dry, essentially pure nitrogen throughout the firing step. This atmosphere is the preferred firing atmosphere for the method of the present invention as illustrated by the fact that the resulting phosphor had a peak intensity exceeding that of Example II, roughly 20% greater than that of the prior art standard.

Comparison of Example II with Example III and Example V with Example VI illustrates that the preferred firing atmosphere of the method of this invention is nitrogen. The phosphors obtained in Examples III and VI after firing in nitrogen, for example, were found to be brighter than those obtained from firing in the mildly reducing nitrogen/hydrogen atmosphere of Examples II and V.

EXAMPLE I

A sample of tin and manganese coactivated calcium fluorophosphate phosphor was prepared in accordance with the teachings of example 7 of British Patent Specification 877,536, with the single exception that the hydrated salt, MnHPO$_4$·3H$_2$O, was employed in place of the unhydrated material reported by the patent example. The amount of hydrated manganese hydrogen phosphate used was adjusted to correspond stoichiometrically to the amount of the unhydrated material.

The following materials in the amounts given were weighed into an evaporating dish: CaHPO$_4$ (8.24 g); CaCO$_3$ (2.72 g); CaF$_2$ (0.79 g); SnHPO$_4$ (0.18 g); and MnHPO$_4$·3H$_2$O (0.38 g).

The powders were thoroughly mixed by slurrying in distilled water, wet milled, and dried for 30 minutes at 300° C. The dried mixture was placed in an alumina boat and fired at 700° C. for one half hour in a 0.5% H$_2$/99.5% N$_2$ atmosphere flowing at a rate of 1 liter/minute. After this firing, the resulting phosphor exhibited only weak fluorescence at 575 nanometers wavelength when excited by 254 nanometer ultraviolet light.

The phosphor was ground and refired three successive times for one half hour periods each at 1050° C. under the same flowing hydrogen/nitrogen atmosphere employed in the initial firing. After each firing, the magnitude of fluorescence at 575 nanometers (under 254 nanometer excitation) was measured. The peak emission intensity at 575 nanometers after each successive 1050° C. refiring were respectively 66%, 66%, and 54% of that of the commercial antimony-manganese activated calcium halophosphate standard, respectively.

EXAMPLE II

The starting materials were dry blended in the proportions indicated: CaHPO$_4$ (26.89 g); CaCO$_3$ (12.89 g); CaF$_2$ (3.12 g); Sn$_2$P$_2$O$_7$ (0.49 g); MnCO$_3$ (2.37 g); and diammonium hydrogen phosphate (5.28 g). The resulting blend was divided roughly into two portions. Each portion was separately loaded into a 1.5 cm ×3.8 cm ×9.6 cm alumina boat and covered with a quartz plate. The covered boat and contents were placed in a tube furnace through which a 0.5% H$_2$/99.5% N$_2$ gas stream was passed at a rate of 1 liter/min. The furnace temperature was slowly raised to 625° C. and held at that temperature for 30 minutes. At the end of this time, a pure nitrogen gas stream was substituted for the hydrogen/nitrogen gas stream passing through the furnace and the furnace temperature was raised to 1200° C. and held at that temperature for 90 minutes. The furnace temperature was then permitted to drop to 700° C. whereupon the sample was moved to the furnace vestibule where it was allowed to cool to ambient temperature under a flowing nitrogen gas atmosphere.

The fired phosphor cake was pulverized and sieved through a 200 mesh screen. The resulting white-bodied phosphor having a nominal formula of Ca$_{4.58}$Sn$_{0.03}$Mn$_{0.25}$(PO$_4$)$_3$F was characterized by an intense uniform yellow emission peaking at about 575 nanometers wavelength under excitation by short wavelength ultraviolet light as shown by the spectral emission curve presented in FIG. 1. The measured brightness of this phosphor was roughly 18% greater than that of the prior art standard.

EXAMPLE III

The starting materials were dry blended in the proportions indicated in Example II. The resulting powder blend was subsequently processed in accordance with the teachings of Example II with the exception that the atmosphere employed throughout the firing and cooling periods was pure nitrogen. The resulting white-bodied phosphor of nominal formula Ca$_{4.58}$Sn$_{0.03}$Mn$_{0.25}$(PO$_4$)$_3$F had a uniform yellow emission with peak emission exceeding the commercial standard by roughly 20%.

EXAMPLE IV

The starting materials were dry blended in the proportions indicated: CaHPO$_4$ (6.80 g); CaCO$_3$ (3.18 g); CaF$_2$ (0.78 g); SnO$_2$ (0.06 g); MnCO$_3$ (0.59 g); and diammonium hydrogen phosphate (1.32 g). The resulting blend was slurried in distilled water to improve the distribution of the diammonium hydrogen phosphate throughout the blend. The slurry was evaporated to dryness and a 10 g sample of the dried material was loaded into a 0.6 cm ×3.6 cm ×5.7 cm alumina boat which was subsequently covered by a quartz plate and placed in a tube furnace. The mixture was heated to 1150° C. in a pure nitrogen atmosphere and maintained at that temperature for a period of 90 minutes. After firing, the sample was cooled to room temperature in a flowing nitrogen atmosphere, pulverized and sieved as described for Example II. The resulting white-bodied phosphor of nominal formula Ca$_{4.59}$Sn$_{0.02}$Mn$_{0.25}$(PO$_4$)$_3$F had a uniform yellow emission at 575 nanometers under 254 nanometer excitation. The peak intensity of the Mn$^{+2}$ emission exceeded by roughly 16% the corresponding emission of the commercial antimony-manganese activated calcium fluoroapatite phosphor standard.

EXAMPLE V

The starting materials were dry blended in the proportions indicated: CaHPO$_4$ (6.80 g); CaCO$_3$ (3.27 g); CaF$_2$ (0.78 g); SnO$_2$ (0.06 g); MnCO$_3$ (0.59 g); and diammonium hydrogen phosphate (1.32 g). The resulting powder mixture was subsequently processed in accordance with the teachings of Example IV, with the exception that a weakly reducing atmosphere of wet 0.5% H$_2$/99.5% N$_2$ was employed throughout the firing and cooling periods. The resulting white-bodied phosphor of nominal formula Ca$_{4.635}$Sn$_{0.02}$Mn$_{0.25}$(PO$_4$)$_3$F had a uniform yellow emission with peak emission exceeding the commercial standard by roughly 3%.

EXAMPLE VI

The starting materials were dry blended in the proportions indicated in Example V and subsequently processed in accordance with the teachings of Example V with the exception that the atmosphere employed throughout the firing and cooling periods was pure nitrogen. The resulting white-bodied phosphor of nominal formula Ca$_{4.635}$Sn$_{0.02}$Mn$_{0.25}$(PO$_4$)$_3$F had a uniform yellow emission with peak emission exceeding the commercial standard by roughly 12%.

While there have been shown and described what are at present believed to be the preferred embodiments of the method of the present invention, it will be obvious to one of ordinary skill in the art to which the invention pertains that various changes and modifications may be made therein without departing from the scope of the invention as defined by the appended claims.

What is claimed is:

1. A yellow-emitting halophosphate luminescent material exhibiting characteristic peak emission at about 575 nanometers when excited by ultraviolet light, said luminescent material having a composition defined by the general formula:

$$Ca_{(5-v-w-x-y)}Me_vSn_wMn_x(PO_4)_3F_z$$

where Me is a divalent metal partially substituting for calcium, tin is in the stannous state, manganese is in the manganous state, and $0.001 \leq v \leq 0.10$
$0.01 \leq w \leq 0.06$
$0.15 \leq x \leq 0.35$
$0.08 \leq y \leq 0.16$
$0.90 \leq z \leq 1.10$ 2. A luminescent material in accordance with claim 1 wherein Me is selected from the group consisting of zinc, cadmium, the alkaline earth metals, and mixtures thereof.

3. A luminescent material in accordance with claim 2 wherein Me is cadmium.

4. A luminescent material in accordance with claim 1 wherein the values of w and x range respectively between about $0.02 \leq w \leq 0.04$ and $0.20 \leq x \leq 0.30$.

5. A process for producing a yellow-emitting halophosphate luminescent material characterized by peak emission at about 575 nanometers when excited by ultraviolet light, said luminescent material having a composition defined by the general formula:

$$Ca_{(5-v-w-x-y)}Me_vSn_wMn_x(PO_4)_3F_z$$

where Me is a divalent metal partially substituting for calcium, tin is in the stannous state, manganese is in the manganous state, and $0.001 \leq v \leq 0.10$
$0.01 \leq w \leq 0.06$
$0.15 \leq x \leq 0.35$
$0.08 \leq y \leq 0.16$
$0.90 \leq z \leq 1.10$ the process comprising forming a powder mixture of compounds selected from the carbonates, fluorides, oxides, and phosphates of calcium, tin, manganese and Me together with an ammonium compound, and thereafter firing said mixture at a temperature in the range between about 1100° C. to about 1300° C. under a neutral or mildly reducing wet atmosphere for a period of time sufficient to result in a luminescent material having said characteristic peak emission.

6. A process in accordance with claim 5 wherein said ammonium compound is added to said powder mixture in an amount of between 0.05 to about 0.15 mole fraction, based upon the total molar amount of all compounds present in said mixture.

7. A process in accordance with claim 5 wherein said mole fraction of said ammonium compound present in said mixture of compounds is about 0.10, based upon the total molar amount of all compounds present in said mixture.

8. A process in accordance with claim 5 wherein said ammonium compound is selected from the group consisting of $(NH_4)_3PO_4$, $(NH_4)_2HPO_4$, $(NH_4)H_2PO_4$ and $NH_4F$.

9. A process in accordance with claim 5 wherein said neutral atmosphere consists essentially of nitrogen.

10. A process in accordance with claim 5 wherein said mildly reducing atmosphere consists essentially of a wet mixture of about 0.5% hydrogen and 99.5% nitrogen by volume.

11. A process in accordance with claim 5 said firing step is carried out for a period of from about one-half hour to about two hours.

* * * * *